(12) United States Patent
Nishikawa

(10) Patent No.: US 8,675,062 B2
(45) Date of Patent: Mar. 18, 2014

(54) SHAPE MEASURING DEVICE, OBSERVATION DEVICE, AND IMAGE PROCESSING METHOD

(75) Inventor: Takashi Nishikawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 210 days.

(21) Appl. No.: 13/299,609

(22) Filed: Nov. 18, 2011

(65) Prior Publication Data

US 2012/0120232 A1    May 17, 2012

Related U.S. Application Data

(63) Continuation of application No. PCT/JP2010/003385, filed on May 20, 2010.

(30) Foreign Application Priority Data

May 21, 2009  (JP) .................................. 2009-122762

(51) Int. Cl.
    *H04N 7/18*        (2006.01)
(52) U.S. Cl.
    USPC ......................................................... 348/135
(58) Field of Classification Search
    None
    See application file for complete search history.

(56) References Cited

U.S. PATENT DOCUMENTS

| 5,151,609 A |   | 9/1992 | Nakagawa et al. |       |
|-------------|---|--------|-----------------|-------|
| 6,032,377 A | * | 3/2000 | Ichikawa et al. | 33/554 |
| 6,490,541 B1 |  | 12/2002 | Ariga et al.   |       |
| 2004/0131348 A1 | | 7/2004 | Ohba et al.  |       |
| 2006/0232788 A1 | * | 10/2006 | Liu ........................ | 356/605 |

FOREIGN PATENT DOCUMENTS

| DE | 100 30 809 A1 | 12/2000 |
| JP | 3-63507       | 3/1991  |
| JP | 11-183147     | 7/1999  |
| JP | 2001-66112    | 3/2001  |
| JP | 3737483       | 11/2005 |

OTHER PUBLICATIONS

PCT Written Opinion issued in International Patent Application No. PCT/JP2010/003385; Date of Mailing: Jul. 13, 2010; original Japanese document and English translation, 7 pages.
International Search Report in International Application No. PCT/JP2010/003385; Mailing Date: Jul. 13, 2010.

* cited by examiner

*Primary Examiner* — Joseph Ustaris
*Assistant Examiner* — Zhubing Ren
(74) *Attorney, Agent, or Firm* — Finnegan, Henderson, Farabow, Garrett & Dunner, LLP

(57) ABSTRACT

A shape measuring device comprises a high speed image processor for extracting one target image and at least one reference image other than the target image from among the plurality of images, and for causing a digital operator to act on the target image and the reference image to calculate local degrees of focusing for each extracted pair of the target image and the reference image on a pixel by pixel basis for the target image; and a control computer for finding the surface height of the measurement object on the basis of the maximum relative movement position of each pixel from among a plurality of the local degrees of focusing calculated on a pixel by pixel basis.

9 Claims, 15 Drawing Sheets

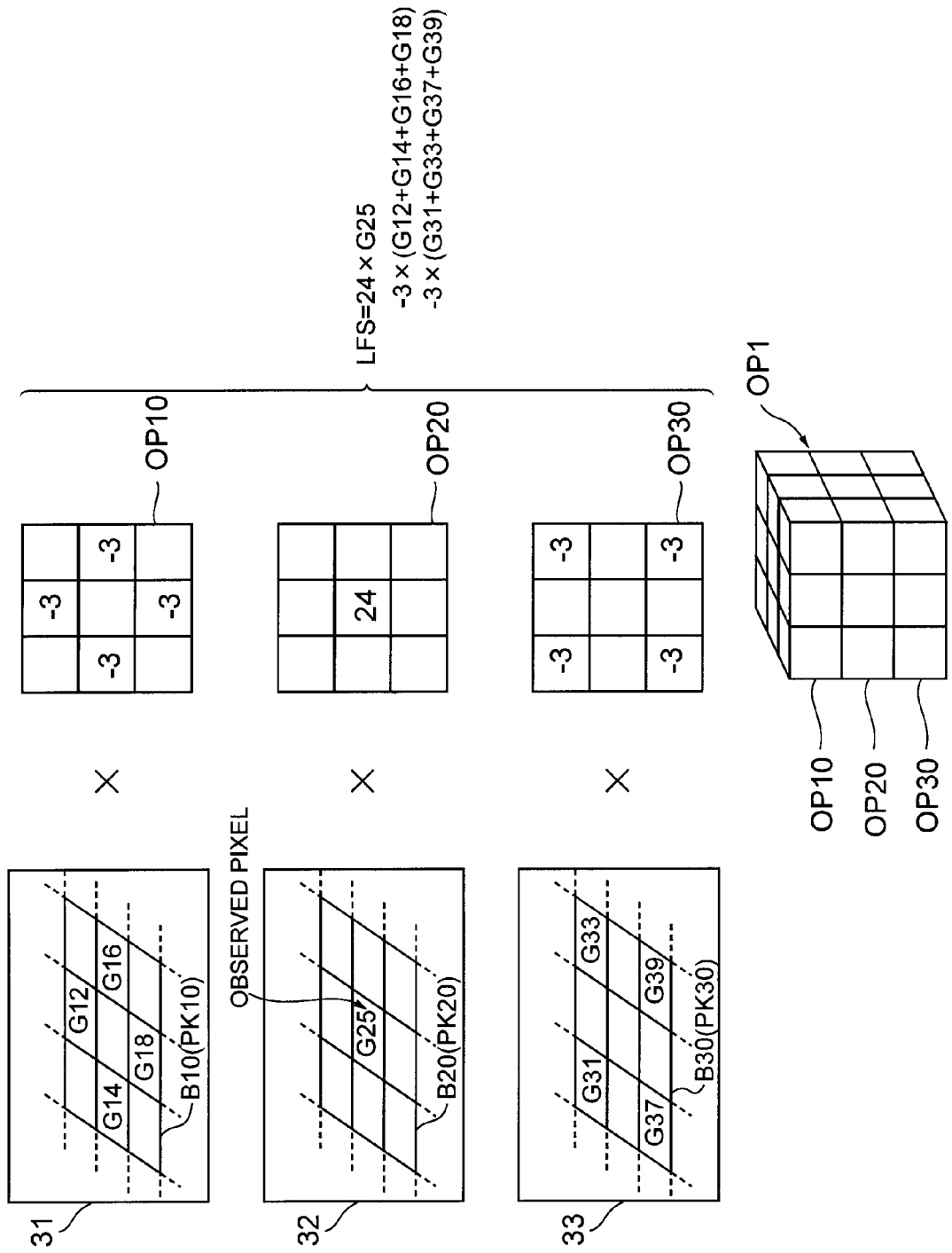

*FIG.8A*

| 240 | 240 | 240 |
|---|---|---|
| 240 | 245 | 240 |
| 240 | 240 | 240 |

| 120 | 120 | 120 |
|---|---|---|
| 120 | 122 | 120 |
| 120 | 120 | 120 |

| 60 | 60 | 60 |
|---|---|---|
| 60 | 245 | 60 |
| 60 | 60 | 60 |

SURFACE HEIGHT

C

70 PER CENT

1 PIXEL AREA (ADJACENT PIXEL)   1 PIXEL AREA   1 PIXEL AREA (ADJACENT PIXEL)

XY (IMAGE ARRAY DIRECTION)

SURFACE HEIGHT

D

E

FREQUENCY

DEGREE OF FOCUSING = 8 × G05
—(G01+G02+G03+G04+G06+G07+G08+G09)

SHAPE MEASURING DEVICE, OBSERVATION DEVICE, AND IMAGE PROCESSING METHOD

This application is a national stage entry under 35 U.S.C. §371 of PCT/JP2010/003385, filed May 20, 2010, which claims priority to Japanese patent application number 2009-122762, filed on May 21, 2009, all of which are incorporated herein by reference in their entirety.

TECHNICAL FIELD

The present invention relates to a shape measuring device for finding the shape of a measurement object from an image obtained by taking a photograph while moving the measurement object relative to an imaging device, and also relates to an observation device and an image processing method thereof.

TECHNICAL BACKGROUND

An observation device is a shape measuring device for computing the surface height of a measurement object observed by a microscope, for example, to find its surface shape (for example, see Patent Literature 1). As shown, for example, in FIG. 14, in such a shape measuring device 500, a piezoelectrically driven device 530 continuously scans an objective 540 back and forth vertically (over a predetermined vertical range)—that is, along the optical axis of the microscope—at a rate of, for example, 15 times per second. During this back-and-forth scanning, images of a specimen 550 imaged by the objective 540 are captured by a high speed camera 51 at a ratio of one image per 1/900 second, converted to a digital signal, and outputted to a control processor 590. The control processor 590 calculates the degree of focusing (the extent of focusing) of each pixel of the inputted image, and finds the position in the optical axis direction in which the maximum degree of focusing has been detected for each pixel within a range from the upper-limit position to the lower-limit position of back-and-forth scanning as the relative height of the point corresponding to that pixel.

PRIOR ARTS LIST

Patent Document

Patent Document 1: Japanese Patent Publication No. 3737483(B2)

SUMMARY OF THE INVENTION

Problems to be Solved by the Invention

A means for finding the degree of focusing for each pixel of an inputted image in the conventional shape measuring device 500, as described above, as shown, for example, in FIG. 15A. The degree of focusing of an observed pixel has been found by extracting a pixel block B100 of 3×3 pixels in an acquired image, and calculating the differential between the pixel value G05 of an observed pixel and a digital operator (differential operator) OP100 acting on the pixel values G01 to G04 and G06 to G09, of the eight pixels peripheral to this pixel.

As shown in FIG. 15B, the corresponding ray density of a luminous flux I near the focal point of an optical microscope theoretically is not a point at the focal position, but due to diffraction, is on an order of the wavelength of the light (for example, about 500 nm). Therefore, the distribution of the quantity of interfering light imaged within one pixel (observed pixel) of the imaging plane of the high speed camera 510 expands inward in the imaging plane in a blur on the order of about 500 nm. Hence, considering that the size of one pixel of the imaging plane projected on the specimen plane (pixel pitch) is about 100 nm, there is a risk that the change in shading (change in pixel value) between the pixel value of an observed pixel and the pixel values of peripheral pixels will be negligible. Near the focal position in the optical axis direction, the degree of focusing in this case does not reach a peak, or the change in the degree of focusing is flat. Therefore, the focal position cannot be determined at a high resolution from the computed size of the degree of focusing, even when measured by positioning the surface height direction at a high resolution.

The present invention was developed in view of such problems, and an object of the present invention is to provide a shape measuring device whereby the shapes of objects can be identified at high resolution, and to provide an observation device and an image processing method thereof.

Means to Solve the Problems

The shape measuring device of the present invention for achieving such an object comprises an imaging device that receives light from a surface of a measurement object illuminated by an illuminating section, and capturing a surface image of the measurement object; a relative moving section that causes a relative movement between the measurement object and the imaging device along the optical axis of an optical system constituting the imaging device; an image processing section that processes a plurality of images of the surface of the measurement object captured by the imaging device while the relative movement; wherein the image processing section comprises a first processing section that extracts one target image and at least one reference image other than the target image from among the plurality of images, and uses a differential operator to act on the target image and the reference image to calculate predetermined feature quantities of the target image on a pixel by pixel basis for each extracted pair of the target image and the reference image; and a second processing section that calculates the surface height of the measurement object on the basis of the maximum relative movement position of each pixel from among a plurality of the feature quantities calculated on a pixel by pixel basis; where the differential operator has coefficients which, in calculation of the feature quantities, are weighted with respect to the pixel values of observed pixel of the target image and the pixel values of adjacent pixels located at different pixel locations from the observed pixels in the reference image; and the feature quantities are derivatives of the pixel values of the observed pixels and the pixel values of the adjacent pixels acted upon by the differential operator.

BRIEF DESCRIPTION OF THE DRAWINGS

FIG. 6 is a diagram illustrating calculation of convolutions using digital operators;

FIG. 8 shows pixel values in pixel blocks, where FIG. 8A is a pixel block having a surface in a position on the optical axis of a pixel-conjugate area, FIG. 8B is a pixel block when located at same distance from the surface, and FIG. 8C is a pixel block when offset from the surface by ¼ of the wavelength in the optical axis direction;

FIG. 10A to FIG. 10C are diagrams showing variant examples of digital operators;

DESCRIPTION OF THE EMBODIMENTS

Figure 1:
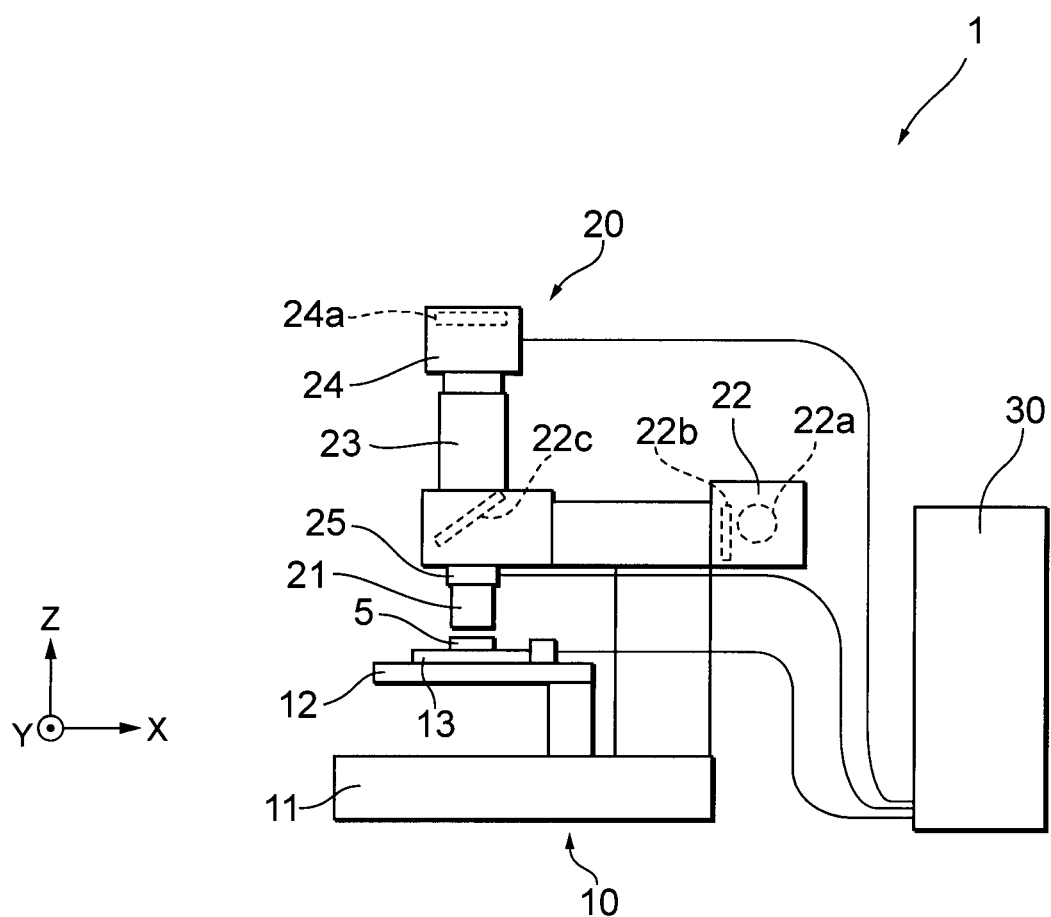
FIG. 1 is a schematic view of a shape measuring device (observation device) according to the present embodiment.

Preferred embodiments of the present invention will be described with reference to the appended drawings. FIG. 1 shows a schematic diagram of a shape measuring device (observation device) according to the present embodiment. First, the overall configuration of the shape measuring device 1 will be described with reference to this drawing. This shape measuring device 1 comprises primarily a microscope 10, an imaging section 20, and a control processor 30.

The microscope 10 comprises a microscope base 11 for supporting the imaging section 20, a microscope specimen stage 12 erected on the floor of the microscope base 11, and a finely driven stage 13 disposed on the upper face of the microscope specimen stage 12.

A specimen 5, which is a measurement object and is shaped, for example, as a flat plate, is placed on the upper face of the finely driven stage 13. The finely driven stage 13 moves the specimen 5 supported on its upper face horizontally relative to the imaging section 20; that is, perpendicular relative to the optical axis of the imaging optical system constituting part of the imaging section 20, at a high precision on an order of nanometers according to a stage drive signal from a drive control device 36 constituting part of the control processor 30 (see FIG. 3). The finely driven stage 13 houses a linear encoder 13a (see FIG. 3). This linear encoder 13a detects the horizontal position of the specimen 5 (finely driven stage 13) at a high precision on an order of nanometers, and outputs this detection signal to the control computer 35 of the control processor 30 (see FIG. 3). In this embodiment, as shown in FIG. 1, a description is given by referring to the in-plane direction of the finely driven stage 13 as the xy-axis direction (horizontal direction), and the optical axis direction of the imaging optical system of the imaging section 20 as the z-axis direction (vertical direction).

Figure 2:
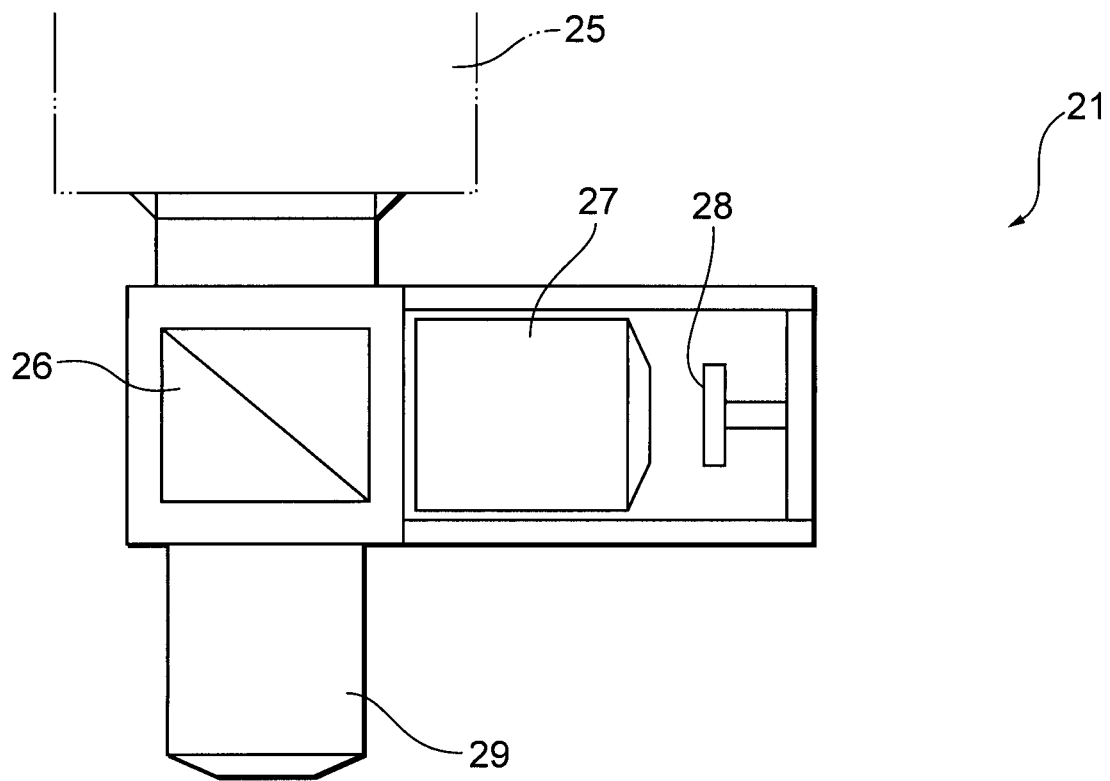
FIG. 2 is a schematic view of a two-beam interference objective.

The imaging section 20 is configured having a two-beam interference objective 21 configured as shown in FIG. 2 and disposed Above and facing the microscope specimen stage 12, a microscope luminaire 22 having the two-beam interference objective 21 attached below, a microscope lens barrel device 23 attached above the microscope luminaire 22, and a high speed camera 24 attached above the microscope lens barrel device 23. The two-beam interference objective 21 is attached below the microscope luminaire 22 by means of a piezoelectrically driven device 25, which moves this two-beam interference objective 21 incrementally along the optical axis of an object bright-field objective 29 facing this specimen 5.

The piezoelectrically driven device 25 comprises a piezoelectric element (not shown) for varying the length by varying the application voltage, and a controller (not shown) for driving the piezoelectric element, and in this embodiment, can continuously move back and forth within a predetermined width (for example, a width of 100 μm) at a rate of a plurality of cycles per second. Because this piezoelectrically driven device 25 is attached between the two-beam interference objective 21 and the microscope luminaire 22, the driving force of the piezoelectrically driven device 25 moves the two-beam interference objective 21 back and forth (vertically) along the optical axis of the imaging optical system constituting part of the imaging section 20.

Figure 3:
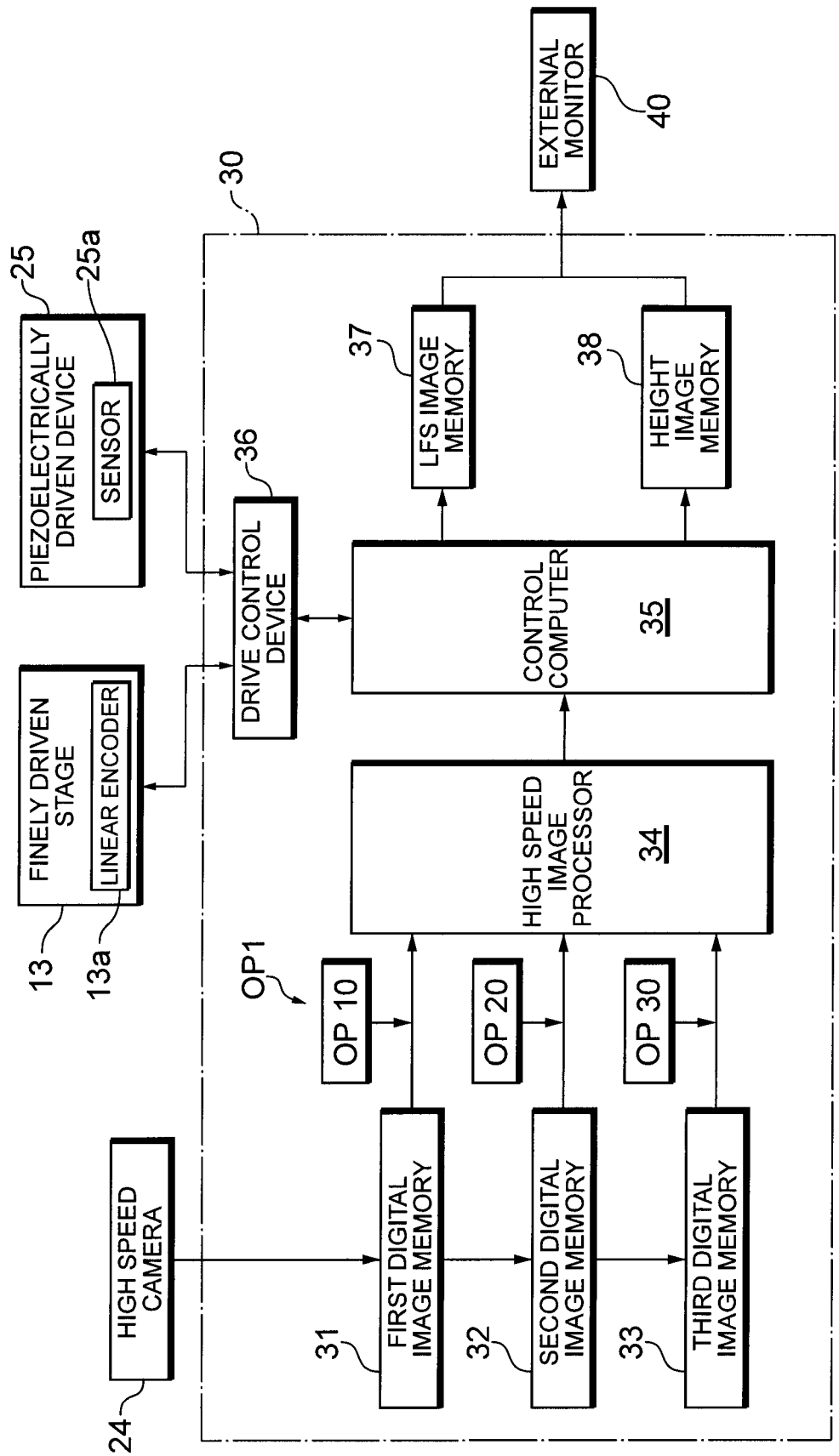
FIG. 3 is a control block diagram of a control processor.

The piezoelectrically driven device 25 operates according to a piezoelectric drive signal from the drive control device 36 constituting part of the control processor 30 (see FIG. 3). The controller of the piezoelectrically driven device 25 houses a sensor 25a for detecting the back-and-forth movement position of the piezoelectrically driven device 25 (that is, the two-beam interference objective 21) (see FIG. 3). This sensor 25a detects the position of the two-beam interference objective 21 in the optical axis direction, and outputs this detection signal to the control computer 35 of the control processor 30 (see FIG. 3).

The microscope luminaire 22 comprises, for example, a light source (white light source) 22a for emitting illuminating light, a band-pass filter 22b for transmitting solely light of a specific wavelength bandwidth (for example, a wavelength bandwidth having a center wavelength λ of 520 nm), and a beam splitter 22c for reflecting the illuminating light passing through the band-pass filter 22b toward the two-beam interference objective 21 while allowing light from the two-beam interference objective 21 to pass through; and provides epi-illumination for irradiating the (upper) surface of the specimen 5 with illuminating light through the two-beam interference objective 21. The band-pass filter 22b preferably transmits light having a wavelength bandwidth of at least 100 nm.

As shown in FIG. 2, the two-beam interference objective 21 mainly comprises a beam splitter 26, a reference-plane bright-field objective 27, a reference plane 28, and an object bright-field objective 29. In the present embodiment, the example of a Linnik light interference optical system is shown. The microscope lens barrel device 23 comprises an imaging lens (not shown) inside, and as will be described later, coordinates with the two-beam interference objective 21 to convert interference-figure light that includes an interference fringe into an image on the imaging plane of the high speed camera 24.

The high speed camera 24 has a picture device 24a, such as a CCD or a CMOS, to form a configuration capable of continuously taking a predetermined number of image captures, and converts a picture signal (luminance information) obtained by capturing an image on the imaging plane of the surface of the picture device 24a (an image of the surface of the specimen 5 including an interference fringe) to a digital signal for output to the first digital image memory 31 of the control processor 30 (see FIG. 3). During this procedure, the sampling interval (image acquisition interval) ΔP of an image is determined by the number of image captures of the high speed camera 24 and the scanning width of the two-beam interference objective 21, and is set, for example, to a smaller interval than the center wavelength region λ of the light utilized.

As shown in FIG. 3, the control processor 30 mainly comprises digital image memories 31, 32, and 33 for storing the image data acquired by the high speed camera 24 by a unit of one picture plane (one frame), a drive control device 36 for controlling the operations of the finely driven stage 13 and the piezoelectrically driven device 25, a high speed image processor 34 for applying image processing (to be described in detail later), and a control computer for exercising overall control over the operations of these components.

In the shape measuring device 1 configured in this way, the illuminating light emitted from the light source 22a and transmitted by the band-pass filter 22b is reflected about 90° downward by the beam splitter 22c, then reaches the two-beam interference objective 21 (see FIGS. 1 and 2). Next, the incident light on the two-beam interference objective 21 is split in two by the beam splitter 26 inside the two-beam interference objective 21, one beam passes through the object bright-field objective 29 to irradiate the (upper) surface of the specimen, and the other beam passes through the reference-plane bright-field objective 27 to irradiate the reference plane 28. Next, the illuminating light reflected by the surface of the specimen 5 and the reference plane 28 is passed through the beam splitter 22c by the beam splitter 26 inside the two-beam interference objective 21 to form an image on the imaging plane of the picture device 24a in the high speed camera 24, where the two beams of illuminating light generate an interference fringe according to the optical path difference (phase difference) thereof. The high speed camera 24 captures the interference-figure light and converts the captured picture signal to a digital signal for output to the first digital image memory 31 of the control processor 30.

During this procedure, the two-beam interference objective 21 is moved by the drive force of the piezoelectrically driven device 25 back and forth along the optical axis of the imaging optical system constituting part of the imaging section 20 (vertically) at a rate of a plurality of cycles per second to continuously vary the focal position (imaging plane) of the optical system in the optical axis direction. The high speed camera 24 continually captures images of the (upper) surface of the specimen 5 at the sampling interval (micro-feed pitch in the optical axis direction) ΔP of the imaging section 20, and can thus acquire a plurality of images according to the back-and-forth movement position of the two-beam interference objective 21.

Besides the picture signal from the high speed camera 24, the control processor 30 also receives input of a detection signal from the linear encoder 13a housed inside the finely driven stage 13, and a detection signal from the sensor 25a housed inside the controller of the piezoelectrically driven device 25. Therefore, the control processor 30 can detect the horizontal position (position in the xy-axis direction) of the finely driven stage 13 and the back-and-forth movement position (position in the z-axis direction) of the two-beam interference objective 21 when capturing images of the specimen 5.

Figure 4:
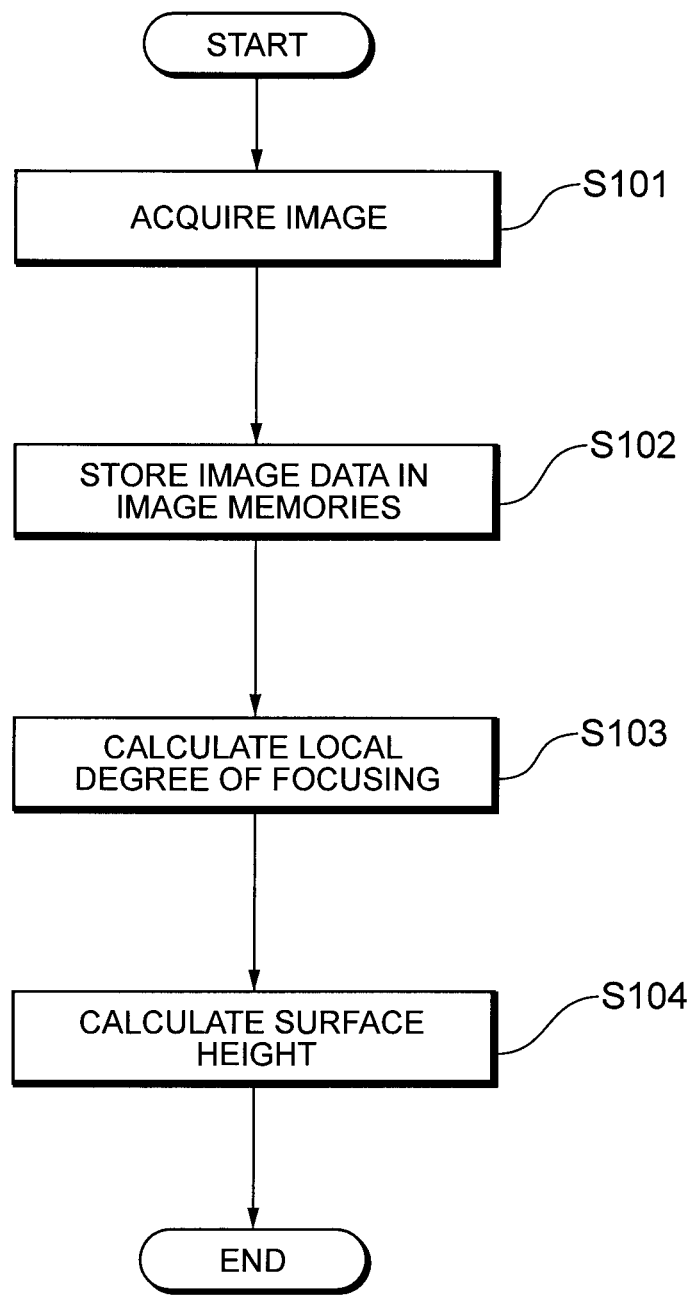
FIG. 4 is a flowchart showing an image processing method for finding surface heights on a pixel by pixel basis.

In the present embodiment, an "interference fringe" is generated on the basis of the optical path difference (phase difference) between the light reflected from the (upper) surface of the specimen 5 and the light reflected from the reference plane 28. Therefore, the control processor 30 can find the surface height of the specimen 5 by applying a predetermined image processing to a plurality of images containing the interference fringe inputted by the high speed camera 24. The image processing method for finding the surface height of the specimen 5 will be described hereinafter while also referring to the flowchart shown in FIG. 4.

The control computer 35 continuously outputs an operating signal to the drive control device 36 for moving the piezoelectrically driven device 25 (the two-beam interference objective 21) back and worth within a predetermined scanning width, and inputs the images captured by the high speed camera 24, and converted to digital signals, to the first digital image memory 31 synchronized with the output of the operating signal (step S101). As a result, the control computer 35 can correlate and save information on the movement distance along the optical axis of the imaging optical system constituting part of the imaging section 20, and the images at the corresponding movement positions.

Figure 5A:
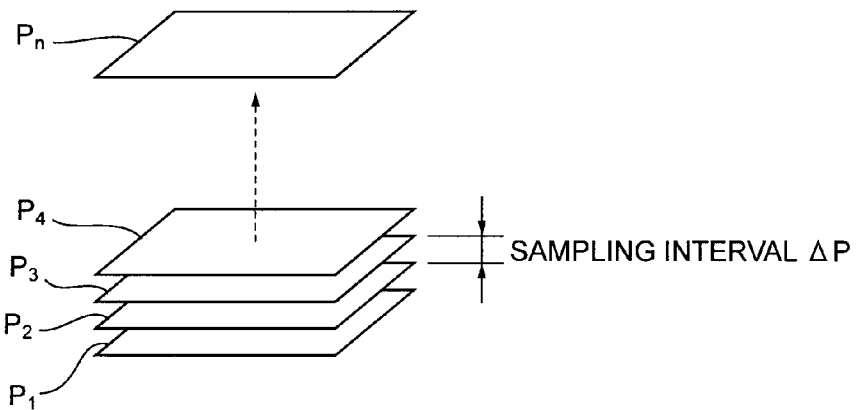
FIG. 5A is a view illustrating the process for acquiring images.
Figure 5B:
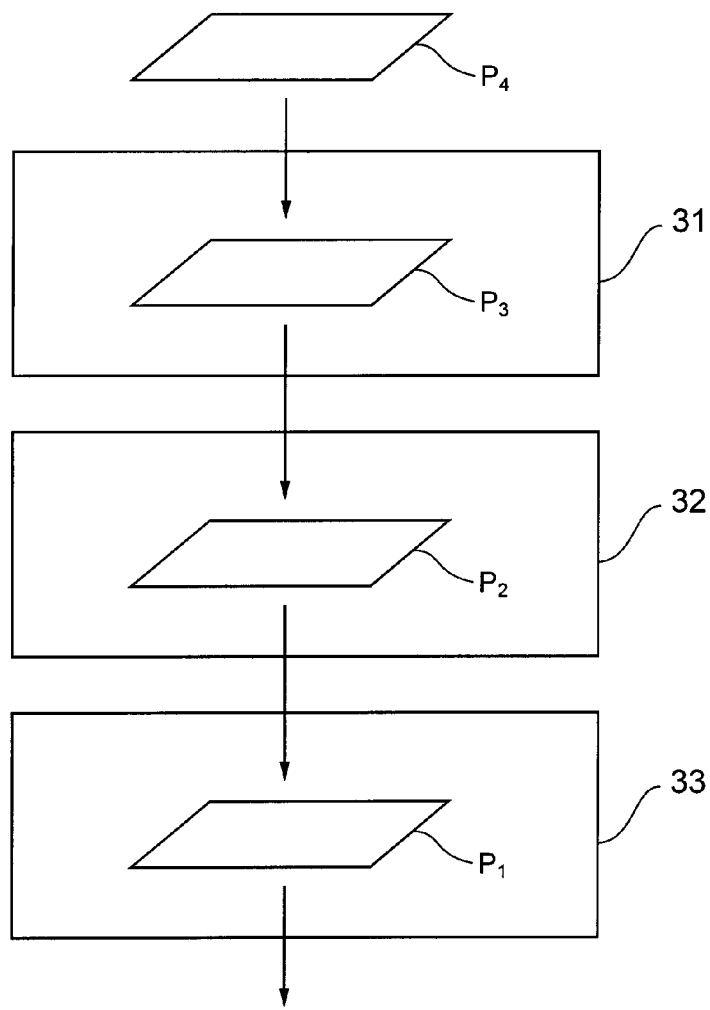
FIG. 5B is a view illustrating the procedure for storing images in digital image memories.

The control computer 35 stores the captured images successively inputted by the high speed camera 24 in the first to third digital image memories 31, 32, 33 on an image by image basis, and updates the stored image when the next image is acquired (step S102). For example, as shown in FIG. 5A, during the process of successively acquiring images $P_1$, $P_2$, $P_3$, ... $P_n$ one at a time at a predetermined sampling interval ΔP, first, when the first (initial) image $P_1$ is acquired, this image $P_1$ is stored in the first digital image memory 31. Next, when the next (second) image $P_2$ is acquired, the image $P_1$ is transferred to and stored in the second digital image memory 32, and the new image $P_2$ is now stored in the first digital image memory 31. Next, when the third image $P_3$ is acquired, the image $P_1$ is transferred to and stored in the third digital image memory 33, the image $P_2$ is transferred to and stored in the second digital image memory 32, and the currently inputted image $P_3$ is stored in the first digital image memory 31 (see FIG. 5B). When the fourth image $P_4$ is acquired, this image $P_4$ is transferred to and stored in the first digital image memory 31, the image $P_3$ is transferred to and stored in the second digital image memory 32, the image $P_2$ is transferred to and stored in the third digital image memory 33, and the first acquired image $P_1$ is erased from the digital memories 31 to 33.

Thus, images are acquired each time that the position of the imaging plane in the optical axis direction changes sequentially. Each time that the imaging plane moves in the optical axis direction, the image to be inputted is continuously stored and updated in the following sequence: first digital image memory 31→second digital image memory 32→third digital image memory 33. Therefore, each time that images are inputted one by one, the acquired images are stored one by one in the image memories 31 to 33 offset vertically by the sampling interval ΔP.

During this procedure, the high speed image processor 34 operates as follows each time that an image is acquired. First, the pixel is set for which a local degree of focusing, to be described later, is to be acquired. The pixel for which this local degree of focusing is to be acquired will be described hereafter as the observed pixel. Next, the target pixels on which the digital operators (differential operators) OP10, OP20, and OP30 are to act are specified from among the pixels of the image data stored in the digital image memories 31, 32, and 33 on the basis of the location of the set pixel. The pixel values on which the digital operators OP10, OP20, and OP30 are to act are multiplied by the coefficients used by these digital operators, and local degrees of focusing are acquired using a predetermined arithmetic expression. During this procedure, the image stored in the image memory 32 corresponds to the target image provided in the claims, and the image stored in the image memory 31 or the image memory 33 corresponds to the reference image provided in the claims.

Thus, candidate values for local degree of focusing are acquired from among a group of three successively sampled image data, and the maximum local degree of focusing is acquired. The local degrees of focusing (LFS) for these pixels are found on a pixel by pixel basis (step S103). Specifically, with the exception of the outermost pixels, all the pixels within the image stored in the second digital image memory 32 constitute the object for calculating the local degree of focusing.

As shown in FIG. 6, during the process of successively acquiring $P_1, P_2, P_3, \ldots P_n$ at the sampling interval $\Delta P$, when any images stored in the digital image memories 31, 32, and 33 are $P_{k10}, P_{k20}$, and $P_{k30}$, the local degree of focusing is calculated for each pixel (observed pixel) within the image $P_{k20}$ stored in the second digital image memory 32.

As shown in FIG. 6, the local degree of focusing is calculated by extracting a pixel block B20 of 3×3 pixels centered on the observed pixel (pixel value G25) in the image $P_{k20}$ stored in the second digital image memory 32, a pixel block B10 of 3×3 pixels in the image $P_{k10}$ stored in the first digital image memory 31 corresponding to the pixel locations in the pixel block B20, and a pixel block B30 of 3×3 pixels in the image $P_{k30}$ stored in the third digital image memory 33 corresponding to the pixel locations in the pixel block B20, and calculating the convolutions (a product sum operation) between these pixel blocks B10, B20, and B30 and the corresponding digital operators OP10, OP20, and OP30.

The objects (basis) of this calculation are the observed pixel (pixel value G25) in the pixel block B10, the pixels located in the corners (pixel values G31, G33, G37, and G39) of the 3×3 pixels in the pixel block B30, and the pixels located on the four tips of an orthogonal cross (pixel value G12, G14, G16, and G18) in the 3×3 pixels in the pixel block B10. The digital operators OP10 to 30 are set by weighting the coefficient for the observed pixel (G25) by 24, and the coefficients for the peripheral pixels (G31, G33, . . . , G12, G14, . . . ) by −3.

The local degree of focusing LFS of the observed pixel is found as shown in the following equation (1) by using the digital operators OP10 to 30 to calculate the convolutions for the nine pixel values that are the object of this calculation.

$$LFS = 24 \times G25 + \{-3 \times (G12+G14+G16+G18)\} + \{-3 \times (G31+G33+G37+G39)\} \quad (1)$$

The control computer 35 calculates the local degree of focusing (LFS) for each pixel, and finds the true surface height of the specimen 5 in an area conjugate to the area of each pixel according to the position in the optical axis direction of the target image having the maximum calculated local degree of focusing (step S104). During this procedure, the position in the optical axis direction of the image when the maximum local degree of focusing was obtained for each pixel within a range from the upper limit to the lower limit of the back-and-forth movement of the two-beam interference objective 21 is found as the relative height of the specimen 5 in an area conjugate to the area of each pixel, and the surface height is calculated from this relative height and already known information, such as the height reference position (measurement points) of the specimen 5.

Specifically, with the finely driven stage 13 stopped, the control computer 35 stores the local degree of focusing for each pixel found from the first group of three image data in the LFS image memory 37 (see FIG. 3). Next, the control computer 35 compares the local degree of focusing, found each time that an image is acquired, with the local degree of focusing for each corresponding pixel stored in the LFS image memory 37, and when the newly acquired local degree of focusing is higher than the local degree of focusing stored in the LFS image memory 37 up to that time, overwrites (updates) the LFS image memory 37 only for the local degree of focusing of this pixel. That is, only the maximum local degree of focusing from among the local degrees of focusing calculated up to that time is stored in this LFS image memory 37 while the maximum local degree of focusing is sequentially updated in each case during the process of acquiring images.

Simultaneously to this procedure, the control computer 35 reads the position information of the two-beam interference objective 21 on the basis of the detection value of the sensor 25a housed in the controller of the piezoelectrically driven device 25, and stores the surface height data of the pixel corresponding to the local degree of focusing stored in the LFS image memory 37 in the height image memory 38 (updates the height data in association with the updating of the LFS image memory 37).

Finally, the maximum local degree of focusing for each pixel is stored in the LFS image memory 37, and the information of the surface height at each corresponding pixel (the relative surface height with respect to the image data for which the maximum local degree of focusing was obtained) is stored in the height image memory 38. The surface height for which the local degree of focusing stored in this height image memory 38 is the maximum is the true surface height of the area conjugate to each pixel.

The information stored in the LFS image memory 37 and the height image memory 38 (LFS image and height image) is outputted by the control computer 35 to an external monitor 40 shown in FIG. 3, and displayed on the external monitor 40 as the measurement result for the surface height of the specimen 5. As a result, the surface shape of the specimen 5 can be observed on the external monitor 40.

Figure 14:
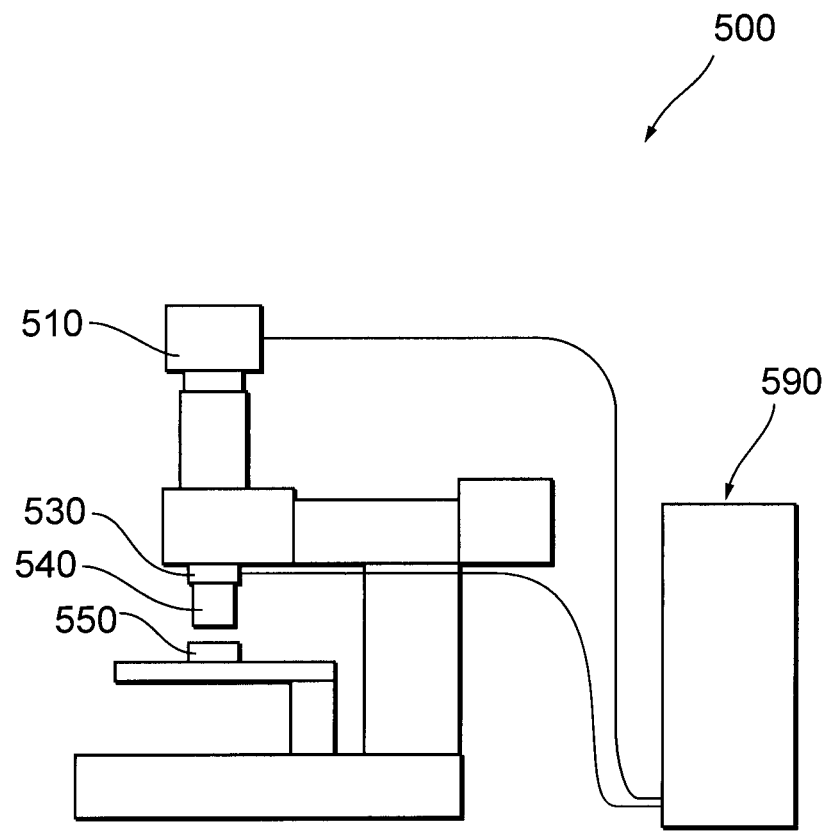
FIG. 14 is a schematic diagram of a shape measuring device according to a conventional example.
Figure 15A:
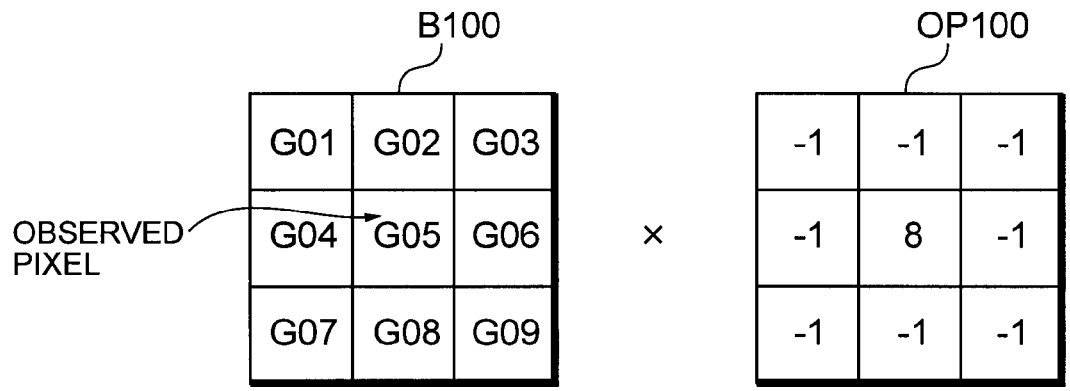
FIG. 15A is a diagram illustrating a conventional method for calculating the degree of focusing.

In the conventional shape measuring device 500 shown in FIG. 14, the degree of focusing for each pixel of an inputted image is found, as shown, for example, in FIG. 15A, by a technique in which the degree of focusing of an observed pixel is found by a differential calculation using a digital operator OP100 for the pixel value G05 of an observed pixel in one image and for the pixel values G01 to G04 and G06 to G09 of eight peripheral pixels in the same image. (In other words, a pixel block B100 of 3×3 pixels including the observed pixel is extracted from only one image, and the degree of focusing of this observed pixel is found by a filtering process using a two-dimensional digital operator OP100 (having only x- and y-coefficients).) The surface height of the specimen 5 is then measured by detecting the location with the maximum degree of focusing for each pixel.

Figure 15B:
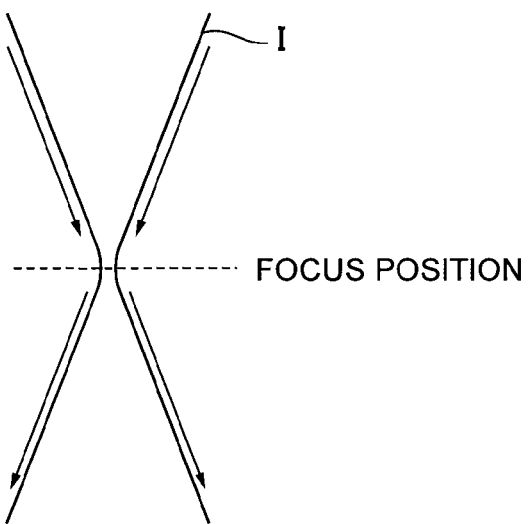
FIG. 15B is a diagram showing the ray density of a luminous flux near the focal point.

As shown in FIG. 15B, the ray density of a luminous flux I near the focal point of an optical microscope theoretically is not a point at the focal position in this case, but due to diffraction, is on an order of the wavelength of the light (for example, 500 nm). Therefore, the interference figure imaged in one pixel (observed pixel) on the imaging plane of the high speed camera 24 also apparently expands as a blur on the order of about 500 nm in the xy direction (inward to the target). Considering that the size of one pixel of the imaging plane projected on the object plane (pixel pitch) is about 100 nm, this means that the change in shading between the pixel value of an observed pixel and the pixel values of the peripheral pixels will be negligible (an interference figure cannot be detected on a pixel by pixel basis). The luminous flux from one point on the adjacent surface of the specimen 5 is also incident on the observed pixel with respect to the area of the surface of the specimen 5 conjugate to the observed pixel. Therefore, interfering light on the surface of the specimen conjugate to the adjacent pixels is incident on the observed pixel so as to be convoluted.

Figure 7A:
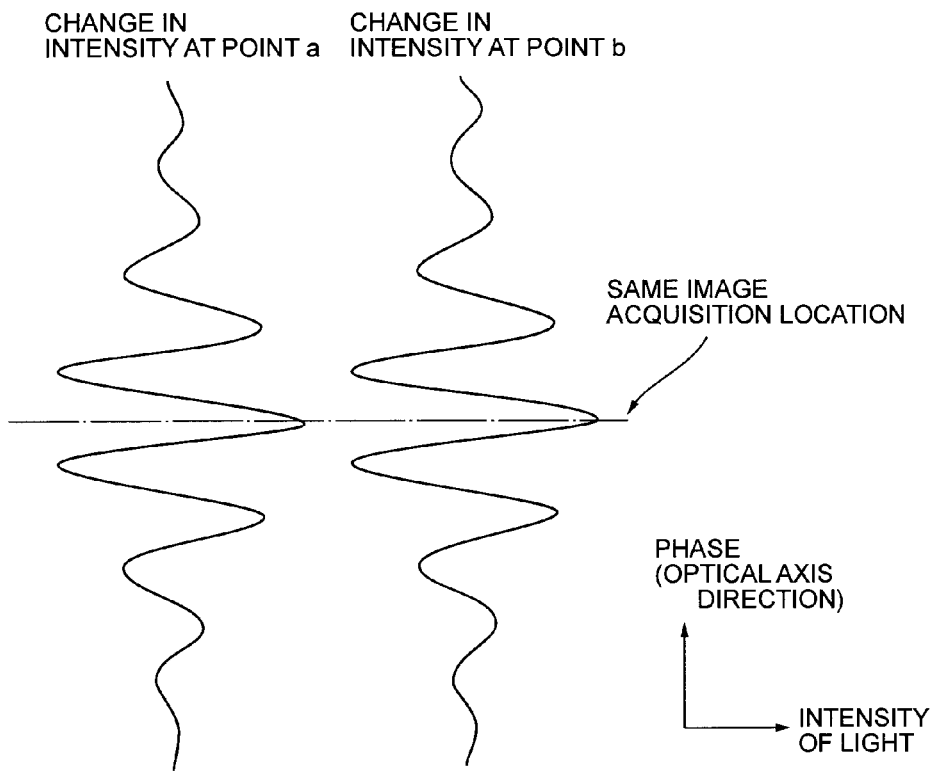
FIG. 7A is a schematic diagram showing change in the intensity of light due to interfering light at adjacent pixel locations.

FIG. 7A shows change in the intensity of light due to interfering light at a location (point a) away from the surface of the specimen 5 conjugate to any given observed pixel within one image (pixel block), and change in the intensity of light due to interfering light at a position conjugate to the adjacent pixels (point b). When there is a difference in the optical axis direction between the location (point a) on the surface of the specimen 5 conjugate to the observed pixel and the location (point b) on the surface of the specimen 5 conjugate to the adjacent pixels, the change in intensity between the interfering light at point a and the interfering light at point b will differ in intensity in the optical axis direction. Because the imaging lens for forming the interference figure has diffraction-limited blurring as described Above, however, the interfering light at points a and b and positions conjugate to other adjacent pixels becomes convoluted. The interfering light at the observed pixel and positions conjugate to other adjacent pixels also becomes convoluted in the same manner as at adjacent pixels. As a result, the change in the intensity of light at the conjugate position of the observed pixel and the conjugate positions of the pixels adjacent to the observed pixel appear nearly identical with respect to change in the optical axis direction, and the difference in the intensity of light between adjacent pixel locations within the same image (in the same position in the optical axis direction) (for example, the locations of the observed pixel (G05) and an adjacent pixel (G06)) is minimal. Therefore, when using conventional filter processing, despite being in a location showing an intrinsic peak (maximum), change in the intensity of light has produced hardly any change in shading (change in pixel value) between an observed pixel and peripheral pixels (eight adjacent pixels) thereof in the same image, and the degree of focusing of the observed pixel, which is found by a product-sum operation between this pixel block B100 and the digital operator OP100, is calculated on the low side. Therefore, when found by filter processing using a conventional digital operator OP100, the degree of focusing does not reach a peak, nor is the change in the degree of focusing flat, even near the focal position in the optical axis direction. As a result, even detecting interfering light by positioning the surface height direction at a high resolution, the focal position could not be determined at a high resolution from the computed size of the degree of focusing.

Figure 7B:
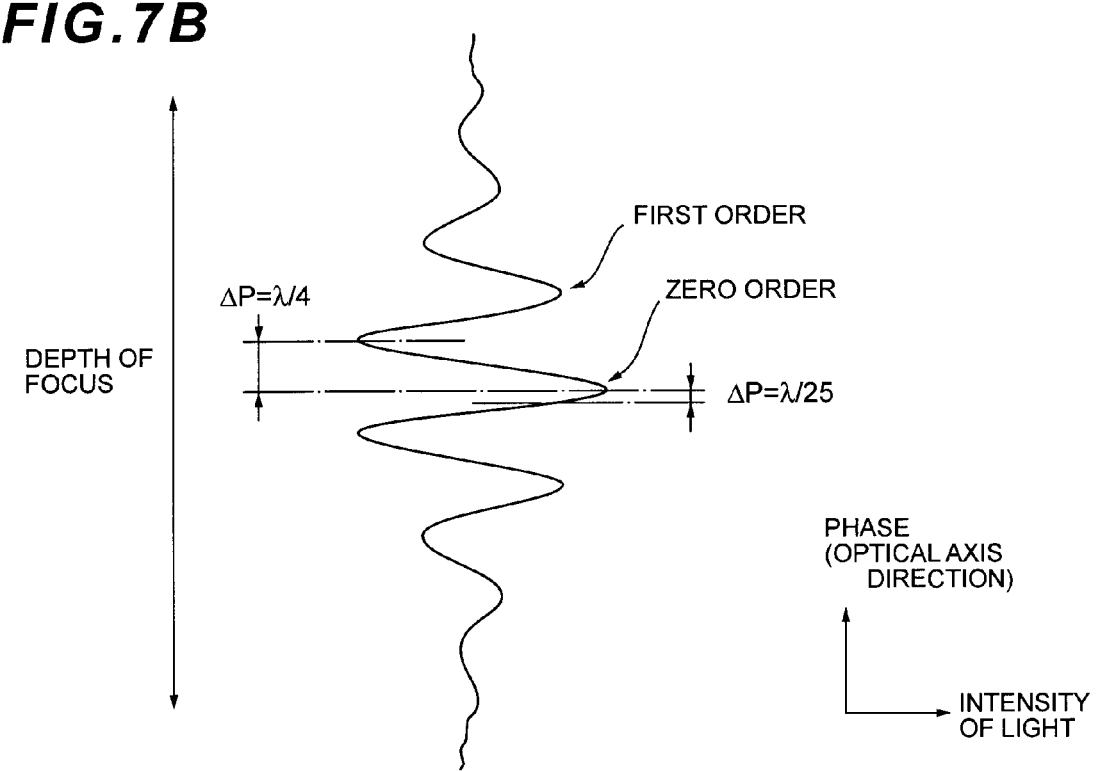
FIG. 7B is a schematic diagram showing change in the intensity of light at an observed pixel location.

As shown in FIG. 7B, however, when using light with a center wavelength of 520 nm as described above, the interfering light at a position conjugate to the observed pixel appears as repeating peaks (highest points) and bottoms (lowest points) at a half-wavelength cycle within the depth of focus of the imaging lens (not shown). The peak with the greatest intensity (amplitude) is the zero-order interference fringe, and the position where this peak appears corresponds to the focal position. Taking this position as a reference, this interfering light can be ascertained as a great change in the intensity of light even when offset by $\frac{1}{25}$ from the center wavelength $\lambda$ (about 20 nm) in the optical axis direction. When offset by $\frac{1}{4}$ the center wavelength $\lambda$ (130 nm) in the optical axis direction, this interfering light can be ascertained as the greatest change in the intensity of light between adjacent peaks and bottoms.

FIG. 8A shows an example of the pixel values of a pixel block B70 for a case in which the position on the optical axis of a pixel-conjugate area is near the surface. FIG. 8B shows an example of the pixel values of a pixel block B80 when located at a sufficient distance from this surface. In the case of the pixel block B70 shown in FIG. 8A, the derivative according to the digital operator OP100 is 40, and in the case of the pixel block B80 shown in FIG. 8B, the derivative according to the digital operator OP100 is 16. FIG. 8C exemplifies pixel values for a pixel block B90 in a case in which values offset from the surface by $\frac{1}{4}$ of the wavelength in the optical axis direction are hypothetically entered for pixels other than the observed pixel. The derivative of this pixel block B90 according to the digital operator OP100 is 1480.

As should be clear from these examples, when the size of one pixel on the surface of a specimen is smaller than 500 nm or when the surface of the specimen is fairly smooth and the difference in height between an observed pixel and adjacent pixels is sufficiently less than $\frac{1}{4}$ of the wavelength, regardless of the large pixel values of the pixels in the pixel block, the derivative of the pixel block B70 is small and nearly unchanged from the derivative of the pixel block B80, which is located at a sufficient distance from the surface. When values for adjacent pixels other than the observed pixel are offset by $\frac{1}{4}$ of the wavelength in the optical axis direction, however, the derivative of the pixel block is more than thirty times as large. When located at a sufficient distance from the surface in the optical axis direction, on the other hand, even when values for adjacent pixels other than the observed pixel are offset by $\frac{1}{4}$ of the wavelength in the optical axis direction, no interfering light is observed, and the derivative found by causing the digital operator OP100 to act on the block is small and almost unchanged. This illustration will be described in detail using equation (2). In an interference optical system, light waves are observed as shown by the following equation (2).

$$I = H \cos(wt + \beta) \qquad (2)$$

where amplitude H and phase $\beta$ can be expressed as follows:

$$H = (A^2 + 2AB \cos \alpha + B^2)^{1/2}$$

$$\beta = \tan^{-1}(B \sin \alpha / (A + B \cos \alpha))$$

A and B are the amplitude of reference light and the amplitude of reflected light. The light waves of the reference light and the reflected light can be expressed by the following equations.

$$I_A = A \cos(wt)$$

$$I_B = B \cos(wt + \alpha)$$

where $w = 2\pi C/\lambda$, $\alpha$ is the phase difference, C is the speed of light, $\lambda$ is the wavelength of light, and t is time. The greatest amplitude, $H = A + B$, is achieved when the phase difference between the reference light and the reflected light is $\alpha = 0$. The smallest amplitude, $H = |A - B|$, is achieved when the phase difference is $\alpha = \pi$. The phase difference is $\alpha = \pi$ when the surface of the specimen is offset by $\frac{1}{4}$ of the wavelength $\lambda$ from the true surface of the specimen. That is, the location of the surface of the specimen 5 can be consistently ascertained by employing, as the pixel values of the adjacent pixels, values offset about $\frac{1}{4}$ of the wavelength $\lambda$ in the optical axis direction from the area conjugate to the observed pixel.

The peak of the interference fringe varies while the intensity (amplitude) of interfering light decreases as first order, second order, etc., the further the interference fringe is from the focal position. Therefore, there is a great difference in the intensity of light detected between the zero-order peak position (focal position) and the first-order peak position even for the same peak, and change in the intensity of light can be ascertained as a greater change near the zero-order peak position (focal position) than near the first-order peak position even at the same degree of movement in the optical axis direction. First-order interference is due to light that is incident after being delayed or advanced in phase by one wavelength with respect to light reflected from the reference plane 28. Because the peak position of this light varies with the wavelength, the first-order peak intensity observed is reduced compared with the zero-order intensity. When the wavelength bandwidth of irradiated light is 100 nm or less, however, the light becomes increasingly monochromatic, the degree of reduction in the intensity of high-order interference peaks is less, and the risk of making a mistake when detecting the zero-order interference position increases. Therefore, the wavelength bandwidth of irradiated light is preferably 100 nm or greater.

Figure 9:
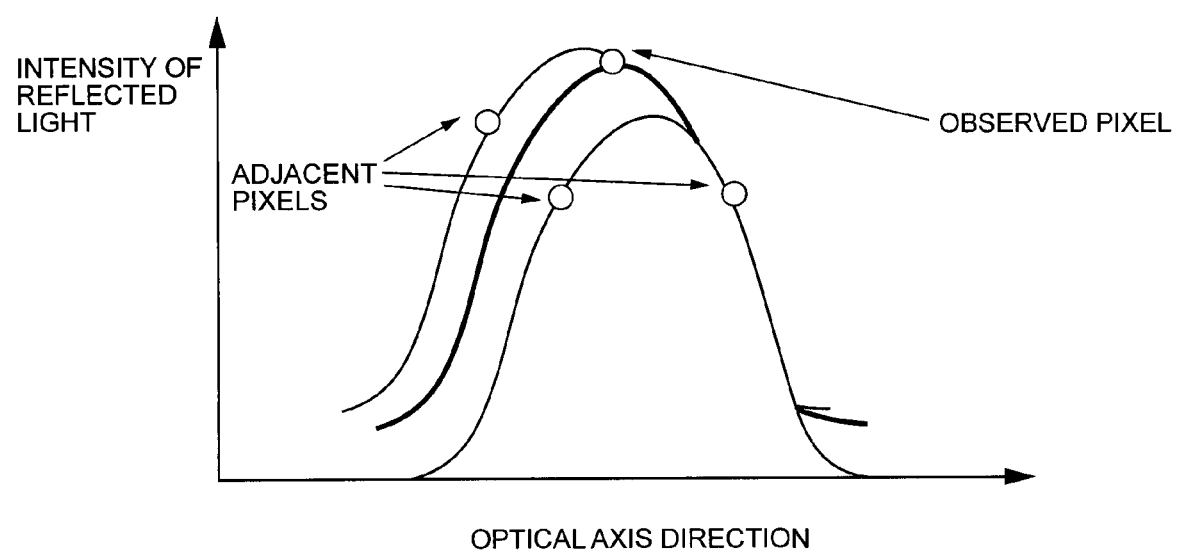
FIG. 9 is a diagram showing change in luminous flux when interfering light and scattered light are added.
Figures 10A, 10B, 10C:
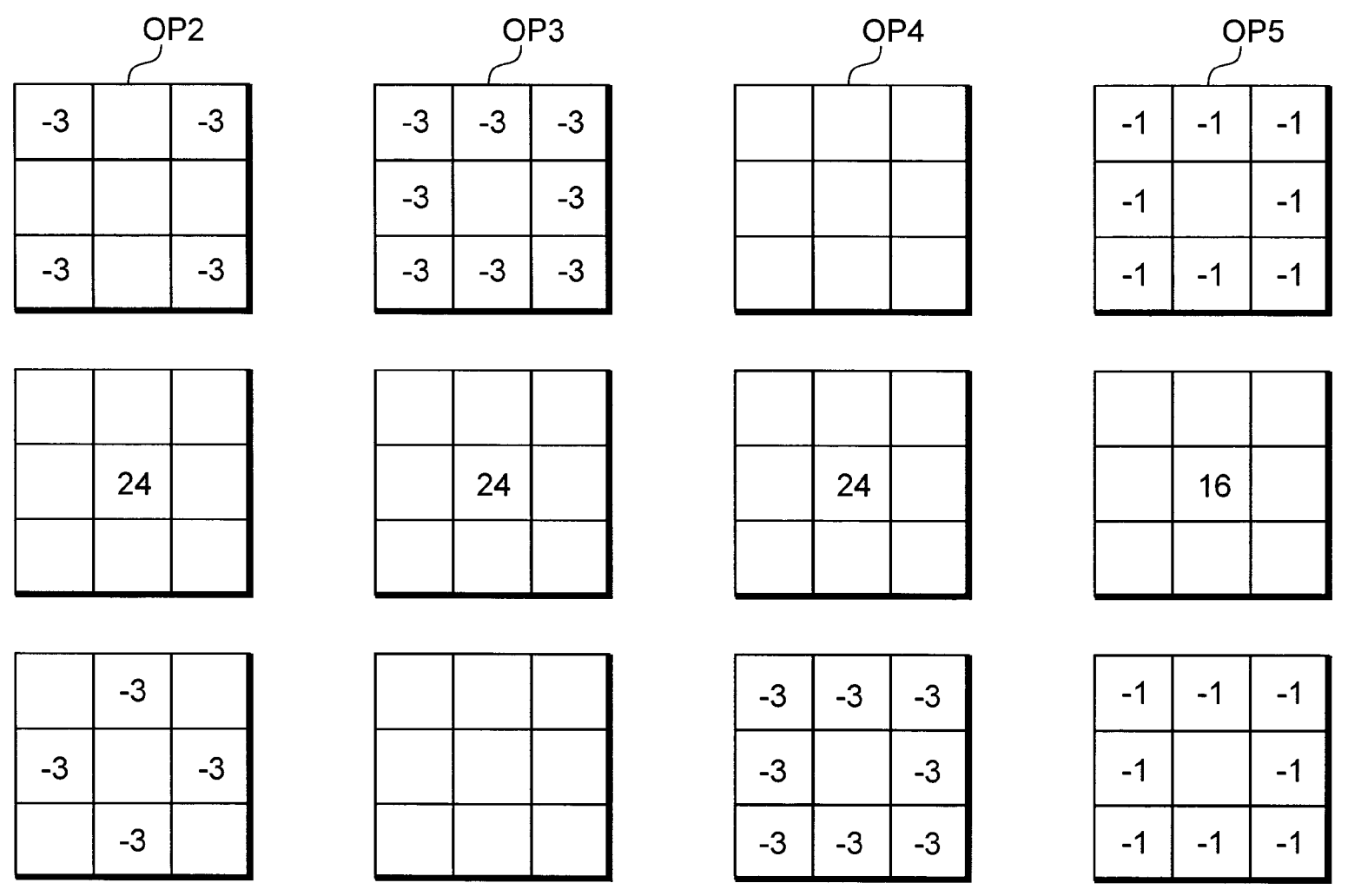

Some of the light incident on the area conjugate to the observed pixel may be scattered due to fine irregularities. Because phase relationships are disturbed when light scatters, there is no interference with the reference light. The light falls within the depth of focus of a high power lens of 0.3 μm even when the position in the optical axis direction is offset by about ¼ of the wavelength λ (about 0.12 μm). Therefore, the difference in quantity of light between the observed pixel and an area that is slightly offset in the optical axis direction from the conjugate area is relatively small. Due to the additivity of light, interfering light and scattered light becoming a combined luminous flux, which reaches the imaging plane of the picture device 24*a* (FIG. 9 shows this schematically). To detect the point on the optical axis where this scattered light reaches a peak, the combined weight of the pixels above and below the observed pixel on the optical axis is set to zero, as may be seen in the digital operators OP illustrated in FIG. 10 and described in detail later. Although this description deals with detecting scattered light, expressed more generally, change in the quantity of reflected light within the depth of focus in the optical axis direction is very slight, and detection sensitivity for detecting optical phenomena having great change in the xy-direction can be improved by not making the difference between the pixels above and below on the optical axis an object of detection. In the present invention, however, the position changes only in the optical axis direction, and finding the difference in output for the pixels above and below, which are in the same location in the plane perpendicular to the optical axis, has not been excluded from the scope of the rights for obtaining local degrees of focusing.

The digital operator OP1 (OP10 to 30) described above has a weight of 24 for the observed pixel, and a weight of −3 for each of the adjacent eight pixels in an image acquired by introducing an offset of one sampling interval ΔP in the optical axis direction. The local degree of focusing LFS calculated for the observed pixel using this digital operator OP1 is found by the equation (1). Equation (1) can be modified and expressed as equation (3) below.

$$LFS = 24 \times \{G25 - 1/8 \times (G31 + G12 + G33 + G14 + G16 + G37 + G18 + G39)\} \quad (3)$$

This equation (3) reveals that the local degree of focusing (LFS) is proportional to the difference between the pixel value G25 of the observed pixel in the target image, and the average pixel value of the adjacent eight pixels in the images above and below the target image in the optical axis direction. This means taking the difference between the observed pixel and the average value of eight pixels selected from among the pixels that are most affected by the quantity of light received by the observed pixel, and are common to the assumed optical phenomena, from among the 26 pixels that are adjacent to the observed pixel in the xyz directions; that is, from the sixteen pixels that exclude the two pixels above and below on the optical axis, and that also exclude the adjacent pixels in the same plane on the optical axis as the observed pixel in the plane orthogonal to the optical axis.

Therefore, even when, for example, the sampling interval ΔP is set to a very small interval (for example, about ⅕ of the center wavelength λ of the light used, as described above: about 20 nm), the local degree of focusing for each pixel in the image obtained at each such interval is found as a quantity that changes greatly from pixel to pixel. Because, in calculating the local degree of focusing, the imaging position having the greatest difference between the pixel value of the observed pixel and the average pixel value of the adjacent eight pixels is also defined as being achieved when the observed pixel location is at the position of peak intensity of interfering light, the focal position can be detected at a high resolution from the position having the maximum local degree of focusing for each pixel.

In the shape measuring device 1 of the present embodiment having such image processing functions, the digital operator OP1 (OP10 to 30) having xyz-directional (three-dimensional) components is a spatial filter capable of enhancing the pixel value of the observed pixel to a degree that increases in the toward the focal position (focusing position) by jointly providing both detection sensitivity in the xy direction and very high detection sensitivity in the z direction with respect to change in the intensity of interfering light. The local degree of focusing found using this digital operator OP1 is calculated as a feature quantity that closely reflects the change in shading (change in pixel value) between an observed pixel of the target image and eight peripheral pixels in the same pixel area within the same image above and below the target image in the optical axis direction. Therefore, the shape measuring device 1 can raise the precision of measurement of surface height and improve the resolution of measurement of the surface height of a specimen by finding the surface height having the maximum local degree of focusing obtained using the digital operator OP1 for each pixel of an acquired image as the true surface height corresponding to each pixel.

The shape measuring device 1 can improve the precision of measurement of surface height even in the case of a very low SAT ratio (the degree of shading of an image used for measurement) of a picture signal used for measurement, such as typically used when the specimen 5 has a glossy surface (for example, a smooth surface having a surface roughness of 0.1 μm or less). This can be achieved by using the local degree of focusing in which the surface shape (minute irregularities) of the specimen 5 is faithfully reflected by the digital operator OP1 as described above.

As described above, the local degree of focusing for an observed pixel was found using the example of the digital operator OP1 (OP10, OP20, and OP30) shown in FIG. 6. The pattern of digital operators, however, is not limited to this example. For example, the digital operator used may be a digital operator OP2 in which the arrangement of the elements of the digital operators OP10 and OP30 has been reversed (see FIG. 10A), digital operators OP3 and OP4 in which the elements of the operators OP10 and OP30 have been combined in one operator (see FIG. 10B), or a digital operator OP5 in which the elements of the operators OP10 and OP30 have been combined and the two operators evenly redistributed (see FIG. 10C). The coefficients inside a digital operator ("8" and "−3") may also achieve the same effects with different values. Especially in the case of the digital operators OP3 and OP4, the image used other than the target image (the reference image) is a single image. The reference image used other than the target image may be an image taken in a different position in the optical axis direction from the target image, a separate image memory section may be disposed for storing the image taken while scanning in the optical axis direction, and any given image may be selected from this image memory section by the control computer 35. As described above, the difference may be detected between an observed pixel and reference pixels at the same location on the xy plane as this observed pixel, but at different positions in the optical axis direction, and this difference value may be compared with a reference pixel (at the same location in the xy-plane coordinates) of an image taken at another position on the optical axis to calculate the local degree of focusing in a manner that takes it into account whether the largest possible difference is achieved. The reference pixels are preferably set as pixels located in an area reached by a luminous flux such that the center of the luminous flux from one point of the measurement object is located at the observed pixel. When detecting the difference in the outputs of the observed pixel and the reference pixels (including the ratio and difference) as the change (variation) in the outputs between these pixels, the manner of calculating the local degree of focusing is not limited to the example described above.

The coefficients and arithmetic expressions of the digital operator may be set so as to output a predetermined value (for example, 0) when the difference is the same from the adjacent pixels for the observed pixel (G25) or reference pixels at the same location in the xy-plane coordinates, but at a different position in the optical axis direction, and to output another value when this difference is different.

Figure 11:
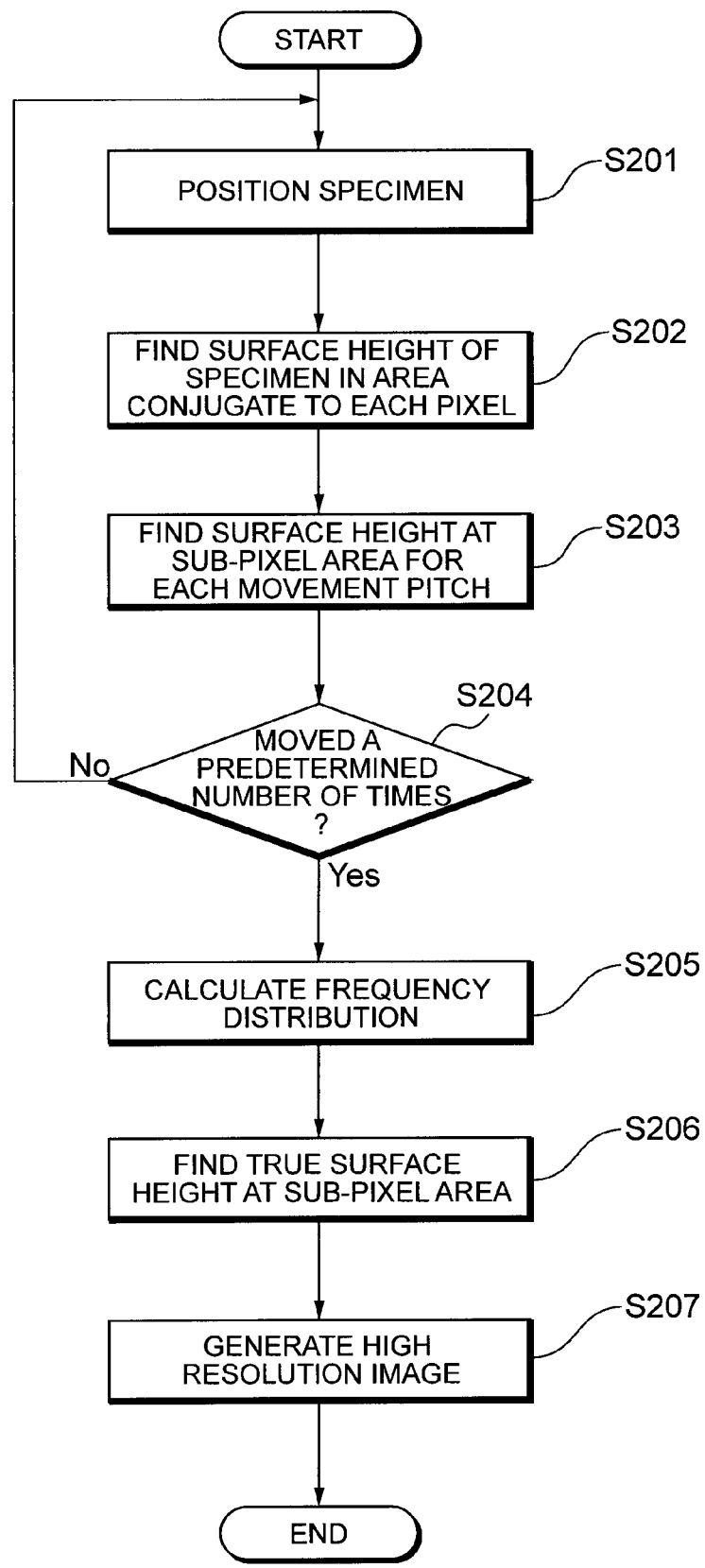
FIG. 11 is a flowchart showing an image processing method for finding the surface height in sub-pixel area units.

In the present embodiment, the control processor 30 can produce an image of the specimen 5 with higher resolution by applying a predetermined image processing to a plurality of images of the surface of the specimen 5 inputted by the high speed camera 24. Therefore, the image processing method for obtaining an image of the specimen 5 with higher resolution will be described hereinafter while additionally referring to the flowchart shown in FIG. 11.

First, the control computer 35 positions the specimen 5 and the imaging section 20 by driving the finely driven stage 13 using the drive control device 36 so as to position the imaging section 20 in a location where the imaging section can capture an image of the measurement area of the surface of the specimen 5 (step S201). The steps S101 to S104 are carried out under this condition. Specifically, the local degree of focusing is calculated for each pixel using a plurality of images taken by the high speed camera 24 while moving the two-beam interference objective 21 back and forth in the z direction, the surface height at which this local degree of focusing is at a maximum is found as the true surface height in the area conjugate to each pixel, and an image of the height of the specimen 5 is generated (step S202).

Figure 12A:
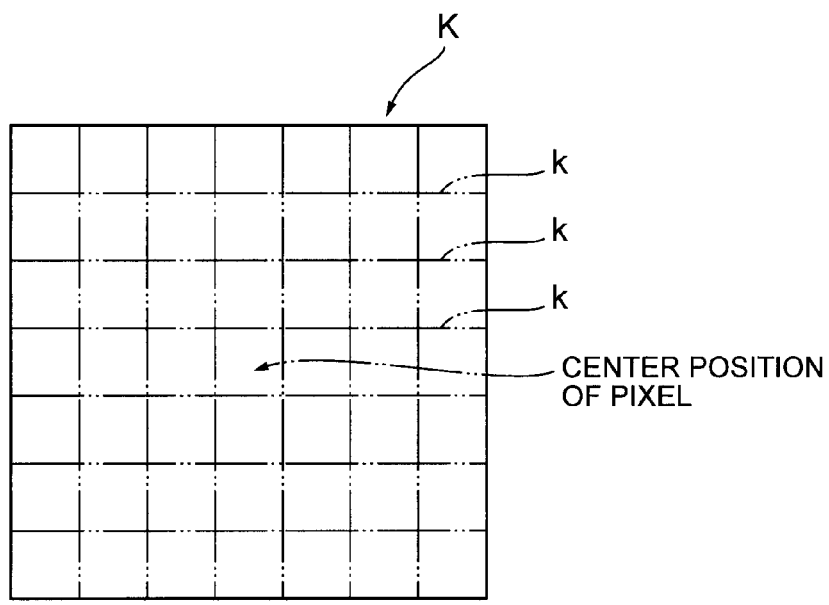
FIG. 12A is a schematic diagram of sub-pixel areas.

When finding the surface height for each pixel, as shown, for example, in FIG. 12A, one pixel area K in the image of the surface of the specimen 5 (height image) is divided into 7×7 sub-pixel areas k, k, etc., and the surface height is calculated for each divided area k (step S203).

Figure 12B:
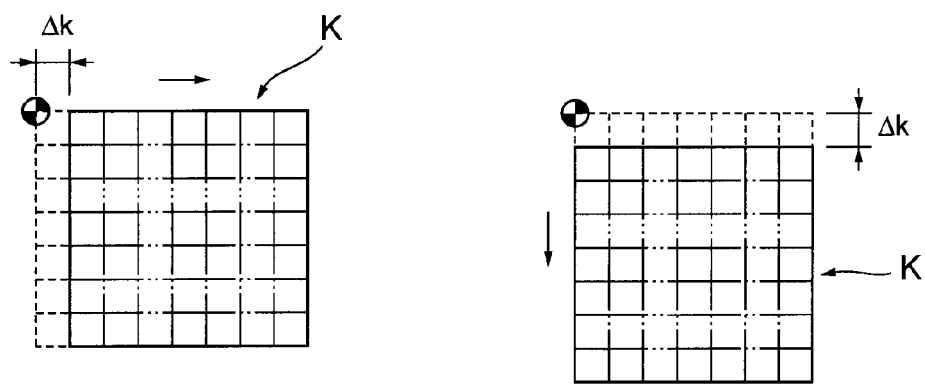
FIG. 12B is a diagram illustrating pixels offset by the size of a sub-pixel.
Figure 13A:
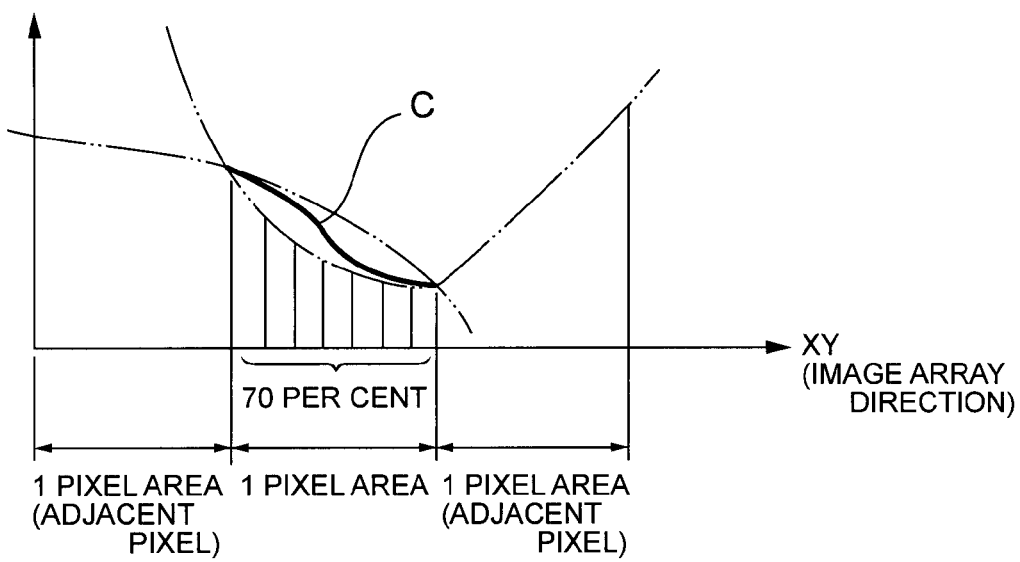
FIG. 13A is a diagram illustrating how to find a function for an observed pixel.

The method for finding surface height in a sub-pixel area will be described hereinafter using FIGS. 12, 13A, and the like. In the method for finding the surface height (relative height) in a sub-pixel area, first, the surface height of the center position in an area conjugate to each pixel is obtained by the step S203 described Above (assuming that the surface height of an area conjugate to each pixel is the surface height at the center position of the area conjugate to this pixel (the center sub-pixel area)). Therefore, these surface heights are used to fit a function (interpolate) between the center position of an area conjugate to a pixel containing a sub-pixel area to be observed and the center positions of areas conjugate to pixels adjacent to this pixel. Next, the surface height of each sub-pixel area to be observed can be found by dividing a pixel area K into seven sub-areas of the pixel in a row on the basis of the surface height curve C obtained by function fitting.

Next, it is determined whether or not the specimen has been moved a predetermined number of times at a movement pitch $\Delta k$ for a length corresponding to a sub-pixel area k (step S204). In the present embodiment, the sub-pixel area is set as 49 pixels (areas). Therefore, the specimen 5 is moved relative to the imaging section 20 seven times in the y-direction for every one movement in the x-direction. Because the specimen is moved seven times in the x-direction, the total number of times the specimen is moved is 49 times. If the specimen has not yet been moved 49 times, the specimen 5 is moved lengthwise and breadthwise in the horizontal direction relative to the imaging section by the finely driven stage 13 at the movement pitch $\Delta k$ (see FIG. 12B). Operation is thus performed again from step S201 to step S203. Next, steps S201 to S204 are repeated for each detection value of the linear encoder 13a housed in the finely driven stage 13 to find the surface height of each sub-pixel area 49 times. As a result, 49 pieces of surface height information per sub-pixel area are found while an area in which each sub-pixel area corresponds to the interior of the relevant single pixel is caused to perform a single lengthwise and breadthwise cycle at the movement pitch $\Delta k$. Therefore, a frequency distribution of surface heights corresponding to the observed location is extracted and found for each sub-pixel area (step S205).

Figure 13B:
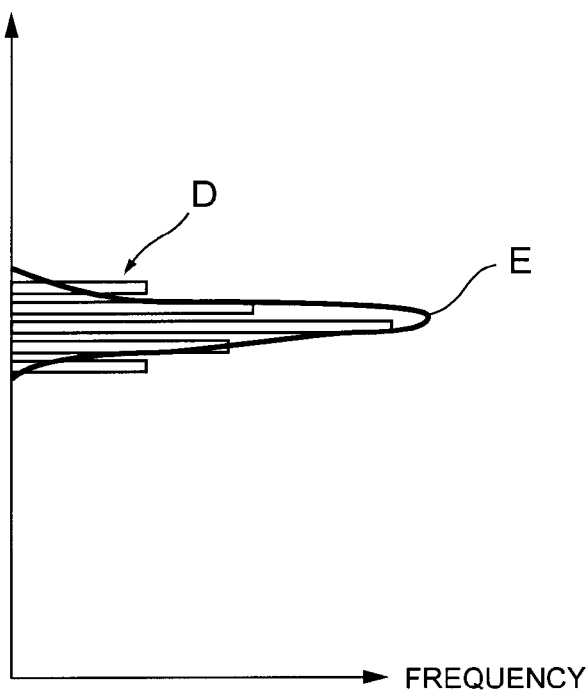
FIG. 13B shows a distribution of surface heights.

When finding the surface height of each sub-pixel area at a location to be observed in an image of the surface of the specimen 5, the frequency distribution D of surface heights can be viewed as a probability distribution generated by these surface heights, as shown, for example, in FIG. 13B. Therefore, the frequency distribution D in the sub-pixel areas is fitted to a normal distribution function to calculate a probability density function E, and the surface height at which this probability density function E reaches a maximum is found as the true surface height in each sub-pixel area (step S206).

Next, in step S205, a height image of the specimen 5 is recreated on the basis of the surface heights found at points corresponding to each sub-pixel (step S207). As a result, when a 500×500 pixel area located toward the center of a picture device having 1000×1000 pixels, for example, is divided as described above into 7×7 sub-pixel areas, a high-resolution height image of the specimen 5 having 3500×3500 pixels can be obtained from a height image that originally had 500×500 pixels. Being an image in which the surface height for each pixel having the maximum local degree of focusing obtained using the digital operator OP1 is found as the true surface height of an area conjugate to each pixel as described above, this height image is an image that also has improved measurement resolution of the surface height of the specimen 5. As a result, the surface shape of the specimen 5 can be measured from a height image of the specimen 5 that has high resolution in both the height direction and the planar directions.

As described above, the shape measuring device 1 according to the present embodiment can produce a high resolution image of a surface of the specimen 5. In particular, the shape of an area on the specimen 5 can be measured with finer resolution than optical resolution. When the movement pitch Δk by the shape measuring device according to the present embodiment is set to a smaller pitch than the optical resolution, the shape of the specimen 5 can be measured at a finer resolution than the optical resolution, even when the pixel pitch of the picture device 24a is not finer than the optical resolution. High resolution can also be obtained because the area on the imaged object plane of the picture device 24a corresponding to the minimum pixels of the image obtained by the shape measuring device 1 according to the present embodiment has finer resolution than the optical resolution of the imaging optical system. This produces a resolution of 10 nm.

Although an embodiment of the present invention has been described above, the present invention is not limited to the above described embodiment, and various modifications may be possible without departing from the scope of the present invention.

In the embodiment described above, the specimen 5 was moved relative to the imaging section 20 by driving the finely driven stage 13 in the horizontal direction, but the present invention is not limited to this configuration. The entire imaging section 20 may be moved relative to the specimen 5, or only the picture device (not shown) in the high speed camera 24 may be moved relative to the specimen.

In the embodiment described above, an example configured using a two-beam interference optical system was described as a method for generating an interference fringe, but the present invention is not limited to this configuration. For example, a differential interference optical system may be used to generate an interference fringe, or a fringe projection method may be used to generate a fringe.

Also, the device need only vary the quantity of light per unit area of a luminous flux from one point of a measurement object by moving in the optical axis direction. Therefore, an imaging optical system may be configured to focus or emit a luminous flux from one point at a given collection angle. The device also need only form an image. Therefore, an imaging system for forming an image by using an energy ray other than light may be applied to focus an energy flux from the surface of a measurement object using, for example, an electron microscope or the like.

In the embodiment described above, an example of light having a center wavelength region λ=520 nm transmitted by the band-pass filter 22b was described, but the present invention is not limited to this configuration. For example, the light may be light of another wavelength region. In this case, the light used preferably has a wavelength bandwidth of 100 nm or greater, and more preferably a wavelength bandwidth of 200 nm or greater. Using such light can further improve measurement precision because dropouts (peaks) in the waveform of the interfering light appear more clearly.

In the embodiment described above, only light of a specific wavelength bandwidth from white light emitted by the light source 22a was transmitted by the band-pass filter 22b, but the present invention is not limited to this configuration. For example, white light from the light source 22a may be irradiated directly without using the band-pass filter 22b. In this case, the light source 22a is preferably a halogen lamp or the like having a broader spectral wavelength.

In the embodiment described above, calculating the local degrees of focusing for the observed pixel is not limited to making calculations for all pixels except the outermost pixels of the picture device 24a. For example, only an area that a measurer wants to acquire may be specified from among the areas captured by the picture device 24a, and local degrees of focusing may be calculated to obtain the relative height distribution in this area.

In the embodiment described above, an example was described in which one pixel area K was divided into 7×7 sub-pixel areas k, but the present invention is not limited to this example, and a pixel area may be divided into some other plurality of sub-pixel areas.

EXPLANATION OF NUMERALS AND CHARACTERS 1 shape measuring device (observation device)
5 specimen (measurement object)
13 finely driven stage (moving mechanism)
20 imaging section (imaging device)
21 two-beam interference objective (light interference optical system, imaging optical system, imaging system)
22 microscope luminaire (illuminating section)
23 microscope lens barrel device (imaging optical system, imaging system)
24a picture device
25 piezoelectrically driven device (relative moving section)
30 control processor (image processing section)
34 high speed image processor (first processing section, image selecting section, change information calculating section)
35 control computer (second processing section, height information determining section)
LFS local degree of focusing (feature quantity)
OP1 digital operator (differential operator)

The invention claimed is:

1. A shape measuring device, comprising:
an imaging device that receives light from a surface of a measurement object illuminated by an illuminating section, and capturing a surface image of the measurement object,
a relative moving section that causes a relative movement between the measurement object and the imaging device along the optical axis of an optical system constituting the imaging device,
an image processing section that processes a plurality of images of the surface of the measurement object captured by the imaging device;
wherein, the image processing section comprises:
a first processing section that extracts one target image and at least one reference image other than the target image from among the plurality of images, and uses a differential operator to act on the target image and the reference image to calculate feature quantities of the target image based on each extracted pair of the target image and the reference image; and
a second processing section that calculates the surface height of the measurement object on the basis of the maximum relative movement position of each pixel from among a plurality of the feature quantities calculated on a pixel by pixel basis;
where the differential operator has coefficients which, in calculation of the feature quantities, are weighted with respect to the pixel values of observed pixel of the target image and the pixel values of adjacent pixels located at different pixel locations from the observed pixels in the reference image; and the feature quantities are derivatives of the pixel values of the observed pixels and the pixel values of the adjacent pixels acted upon by the differential operator.

2. The shape measuring device according to claim 1, wherein, the shape measuring device further comprises a light interference optical system that splits the light from the illuminating section to separately illuminate the measurement object and a reference plane, and causes interference between the light reflected from the measurement object and the reference plane to generate an interference fringe.

3. The shape measuring device according to claim 2, wherein, moving the measurement object relative to the imaging device by the relative moving section causes the interference fringe to change by varying the distance between a surface of the measurement object and a splitting position at which light is split between the reference plane and the surface of the measurement object.

4. The shape measuring device according to claim 1, wherein:

the imaging device has an imaging optical system that forms a surface image of the measurement object, and a picture device that captures the surface image of the measurement object formed by the imaging optical system; and a pixel of the picture device is finer than the optical resolution of the imaging optical system.

5. The shape measuring device according to claim 4, wherein the shape measuring device comprises a moving mechanism that moves the measurement object relative to the imaging device in a direction perpendicular to the optical axis of the optical system constituting the imaging device; and the moving mechanism is moved in the relative fashion at a smaller movement pitch than the width of the pixel.

6. The shape measuring device according to claim 1, wherein the illuminating section is capable of emitting illuminating light having a wavelength bandwidth of 100 nm or greater.

7. The shape measuring device according to claim 1, wherein the differential operator has coefficients which are weighted with respect to the pixel values of observed pixel of the target image, the pixel values of four pixels peripheral to pixels having a pixel location matching the observed pixels in a first reference image captured before the target image in the image acquisition interval, and the pixel values of four pixels peripheral to pixels having a pixel location matching the observed pixels in a second reference image captured after the target image in the image acquisition interval; and the four peripheral pixels in the first and second reference images constitute mutually different pixel locations.

8. The shape measuring device according to claim 7, wherein the image acquisition interval is smaller than the center wavelength region of the illuminating light emitted from the illuminating section.

9. An image processing method performed using the shape measuring device according to claim 5, the image processing method comprises:

extracting a portion of the surface image corresponding to the same location on a surface of the measurement object from among the plurality of images each time that the measurement object is moved by the moving mechanism relative to the imaging device at the movement pitch, finding the surface height of the extracted portion, and finding the frequency distribution of the surface height in the extracted portion;

calculating the probability density function of the surface height on the basis of the frequency distribution, and finding the surface height having the maximum probability density function as the true surface height in the extracted portion; and generating an image of the surface of the measurement object on the basis of the true surface height found.

* * * * *